United States Patent

Kamiya et al.

[11] Patent Number: 5,974,033
[45] Date of Patent: Oct. 26, 1999

[54] DYNAMIC SHAPING APPARATUS OF TRAFFIC OF ATM NETWORK

[75] Inventors: Satoshi Kamiya; Toru Takamichi; Tutomu Murase, all of Tokyo, Japan

[73] Assignee: NEC Corporation, Tokyo, Japan

[21] Appl. No.: 08/815,400

[22] Filed: Mar. 10, 1997

[30] Foreign Application Priority Data

Sep. 6, 1996 [JP] Japan ................................ 8-236112

[51] Int. Cl.$^6$ .......................... H04L 12/24; H04L 12/56
[52] U.S. Cl. ....................... 370/323; 370/230; 370/395; 370/429
[58] Field of Search .................... 370/230, 231, 370/232, 233, 234, 235, 395, 397, 428, 429

[56] References Cited

U.S. PATENT DOCUMENTS

| | | | |
|---|---|---|---|
| 5,737,313 | 4/1998 | Kolarov et al. | 370/234 |
| 5,745,477 | 4/1998 | Zheng et al. | 370/230 |
| 5,754,530 | 5/1998 | Awdeh et al. | 370/232 |
| 5,784,358 | 7/1998 | Smith et al. | 370/395 |
| 5,812,527 | 9/1998 | Kline et al. | 370/232 |

FOREIGN PATENT DOCUMENTS

| | | |
|---|---|---|
| 4-100342 | 2/1992 | Japan . |
| 4-100451 | 4/1992 | Japan . |
| 7-297843 | 10/1995 | Japan . |
| 9407806 | 4/1994 | United Kingdom . |

OTHER PUBLICATIONS

Chang et al., "Interoperability between EFCI and ER switch mechanism for ABR traffic in an ATM network," Computer Communications, pp. 653–658, Jul. 1996.

ATM Forum Traffic Management Specification, Version 4.0, pp. 45–48, 68–71, 92–97, Apr. 1996.

*Primary Examiner*—Chi H. Pham
*Assistant Examiner*—Frank Duong
*Attorney, Agent, or Firm*—Foley & Lardner

[57] ABSTRACT

The invention provides a dynamic traffic shaping apparatus which allows dynamic shaping processing wherein the shaping cell rate is varied dynamically in response to a rate variation of a terminal acquired from a network. The dynamic traffic shaping apparatus includes a rate information processing section for predicting a sending rate of a transmission terminal in response to rate control information detected from a cell directed from a reception terminal side toward a transmission terminal side and successively storing the sending rate in an updating manner as sending rate information of an arrival cell for each virtual path and each virtual channel. The cell stored in a cell buffer for temporarily storing an arrival cell arriving from the transmission terminal side for each virtual path and each virtual channel is read out at an interval based on the sending rate information stored in the rate information processing section corresponding to the virtual path and the virtual channel and is sent out to the reception terminal side by a read control section.

5 Claims, 14 Drawing Sheets

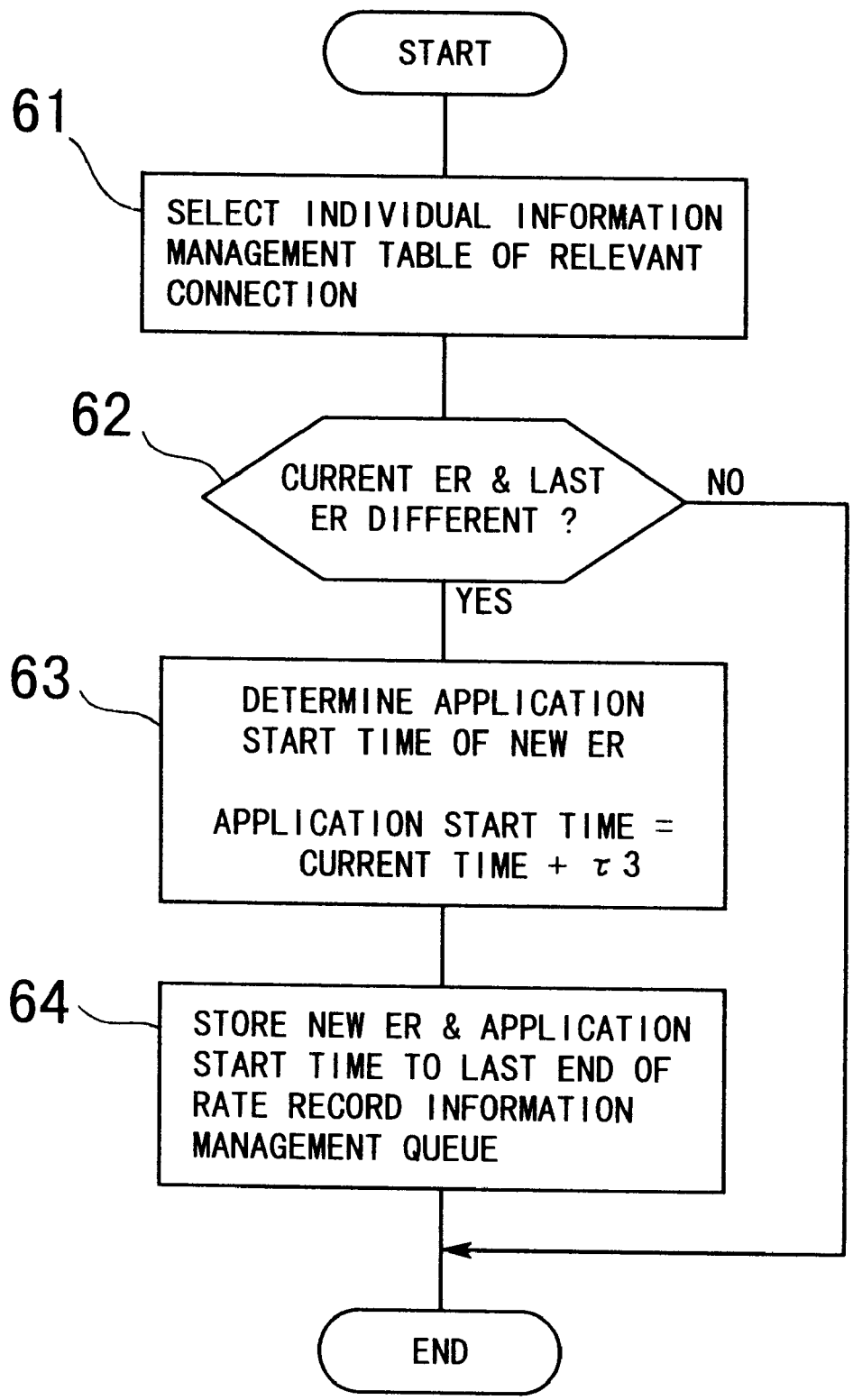

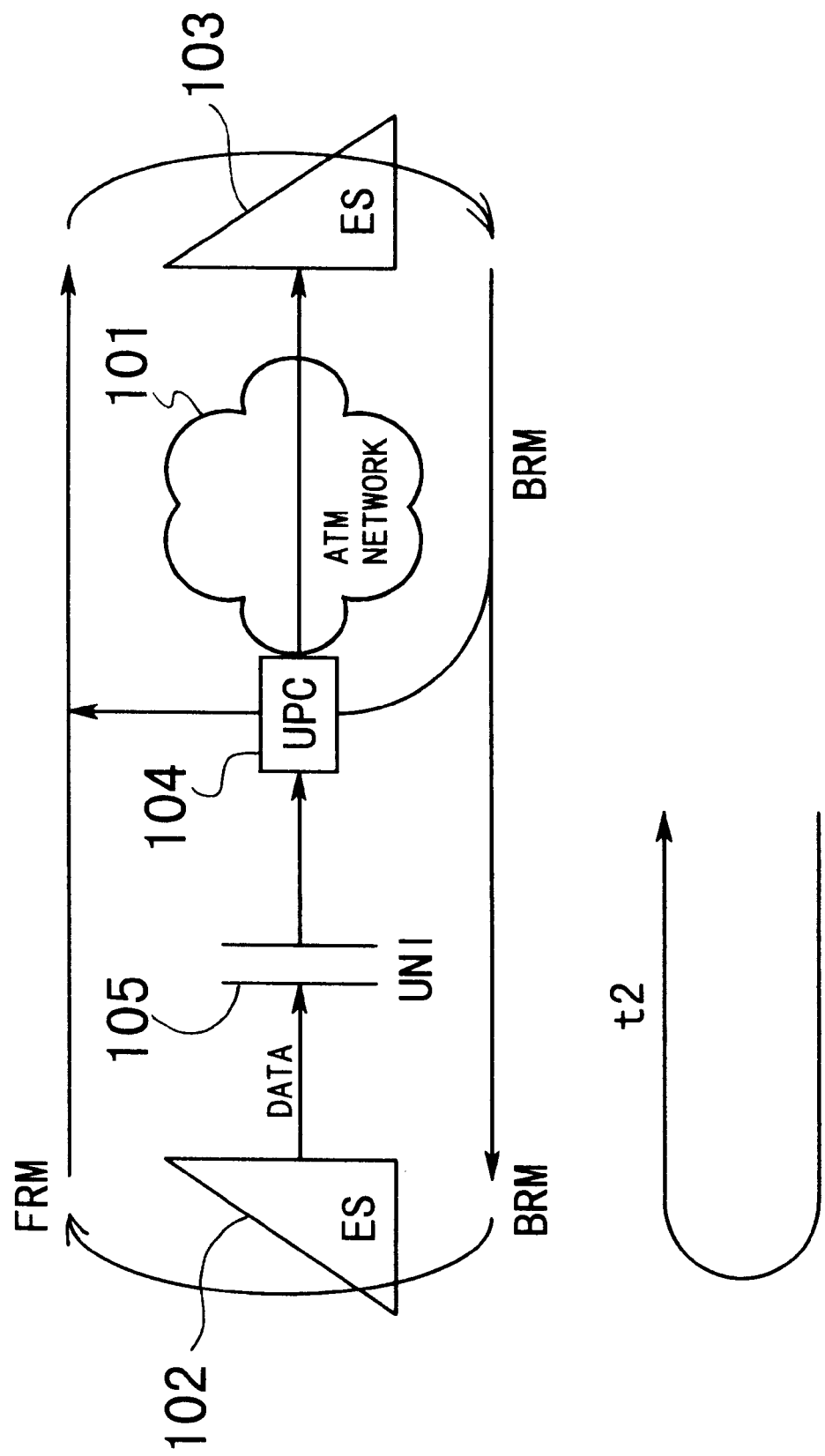

DYNAMIC SHAPING APPARATUS OF TRAFFIC OF ATM NETWORK

BACKGROUND OF THE INVENTION

1. Field of the Invention

This invention relates to a traffic shaping apparatus for an ATM (Asynchronous Transfer Mode) network, and more particularly to a dynamic shaping apparatus which sends out cells into a virtual path or a virtual channel set on an ATM transmission line in an ABR service by an ATM network varying the sending out distance between the cells.

2. Description of the Related Art

In recent years, an available bit rate (ABR) service has been recommended as a service by an asynchronous transfer mode (ATM) network, for example, in the ATM Forum Traffic Management Specification, Version 4.0, April 1996, which will be hereinafter referred to simply as ATM Forum TM. 4.0.

The ABR service is a kind of service which does not compensate for the transmission quality of cell delaying but compensates for the quality of cell losing. In the ABR service, an allowable cell rate (ACR) which is a sending cell rate of a terminal is dynamically allocated in response to a congestion condition of the network. It is to be noted that the "terminal" used in the present specification may be a real terminal actually used by a user which may be called an "end-system (ES)" on a Virtual Source/Virtual Destination (VS/VD) defined in the ABR service, for example, in the ATM Forum TM 4.0.

Where the ABR service is applied to a public network, similarly to a constant bit rate (CBR) service or a variable bit rate (VBR) service provided conventionally, a usage parameter control (UPC) must be installed in a user network interface (UNI). The usage parameter control is used to check the cell conformance that the user sends as traffic and observes a cell rate contracted by the user. Further, a network parameter control (NPC) must be installed in a network node interface (NNI).

However, since the UPC and the NPC used in the conventional CBR and VBR services do not presuppose that a terminal dynamically varies the cell rate in response to a congestion condition of the network, they cannot perform policing conforming to a dynamic variation of the cell rate at which traffic is sent out from the terminal.

Therefore, a UPC and an NPC for the ABR service are provided, and a DGCRA (Dynamic Generic Rate Algorithm) is proposed as an algorithm for the UPC and the NPC, for example, in the ATM Forum TM 4.0.

FIG. 12 is a diagrammatic view of a conventional ATM network which provides the ABR service.

Referring to FIG. 12, a transmission terminal (as a Source End-System (SES) in the ATM Forum TM 4.0) 102 and a reception terminal (as a Destination End-System (DES) in the ATM Forum TM 4.0) 103 are connected to an ATM network 101, and a UPC 104 is provided for a UNI 105 located at an entrance of the ATM network 101.

When the transmission terminal 102 tries to send data to the reception terminal 103, it sends a forward resource management cell (FRM cell). When the FRM cell is received by the reception terminal 103, the reception terminal 103 sends back the FRM cell as a backward resource management cell (BRM cell) to the transmission terminal 102.

When the FRM cell from the transmission terminal 102 or the BRM cell from the reception terminal 103 passes the ATM network 101, the ATM network 101 writes a current congestion condition thereof into the FRM cell from the transmission terminal 102 or the BRM cell from the reception terminal 103.

The transmission terminal 102 varies the sending rate in response to an explicit rate (ER) written in the BRM cell from the reception terminal 103.

The UPC 104 performs policing in response to the DGCRA mentioned above. In the DGCRA, the UPC and the NPC monitor the ER written in the BRM cell from the reception terminal 103, and predicts a rate variation of the terminal based on the ER and then effects policing based on the predicted rate variation.

However, since a UPC and an NPC are usually installed at a location spaced by a large distance from a terminal, a propagation delay is produced when a cell moves between the terminal and the UPC and NPC. Accordingly, a time difference is produced between rate variation operations of the UPC and NPC and the terminal by the propagation delay.

Further, as described above, the ABR service guarantees loss of a cell, but does not guarantee a delay of a cell. On the other hand, a delay of a cell is guaranteed in the CBR service and the VBR service.

Consequently, in an ATM network which provides plural services, a cell of the ABR service is lower in priority in cell sending out than a cell of the CBR service or the VBR service at a terminal and an exchange.

Accordingly, in the ABR service, the cell delay variation (CDV) in the network is increased by priority control by an exchange interposed between the terminal and the UPC and NPC, and the arrival time of the cell at the terminal varies by a large amount. Consequently, the arrival of the BRM cell to the transmission terminal varies by a large amount, and the timing of updating of the sending rate in the transmission terminal varies by a large amount. Consequently, the UPC and NPC exhibit a large variation in time with respect to the variation point of the rate.

Referring to FIG. 12, reference symbol t2 denotes a time required until the UPC 104 varies the monitoring rate after the UPC 104 predicts that the rate of the transmission terminal 102 will vary. This time t2 varies between $\tau 3$ which is a minimum time and $\tau 2$ which is a maximum time.

Against the problem described above, the DGCRA increases, when the rate of the transmission terminal 102 increases, the monitoring rate after lapse of $\tau 3$ which is the shortest time within a prescribed range after the UPC 104 predicts that the rate of the transmission terminal 102 will vary, but decreases, when the rate of the transmission terminal 102 decreases, the monitoring rate after lapse of $\tau 2$ which is the longest time within the prescribed range. Accordingly, the DGCRA has a margin of $\tau 2 - \tau 3$ to a time until the monitoring rate is varied after the UPC and NPC predicts that the rate of the transmission terminal will vary.

However, when the CDV in the network is large, the timing of updating of the transmission rate in the transmission terminal varies by a large amount. Accordingly, since the variation point of the rate varies by a large amount in time, the UPC and NPC must take a large margin in conformity with the time variation. Since an increase of the margin increases the band allocation to a user, there is a problem in that the utilization efficiency of the network is degraded.

Further, similar to the CBR service and the VBR service, the ABR service is required to produce traffic in which the cell delay variation (CDV) is reduced in advance to simplify designing the capacity of a network.

Meanwhile, from the situations of the user and the opposing network sides, production of cell traffic which is not determined to be non-conforming by the UPC and NPC of the destination of the connection is required.

In order to solve the problems described above, similar to the CBR service and the VBR service, the ABR service requires a traffic shaping apparatus which is an apparatus for shaping traffic.

Conventionally, traffic shaping apparatus have been proposed for the CBR service and the VBR service. One such traffic shaping apparatus is disclosed, for example, in Japanese Patent Laid-Open Application No. Heisei 4-100451.

Further, an example of an arrangement of a conventional traffic shaping apparatus for the CBR service and the VBR service has been proposed, and also it has been proposed to install a traffic shaping apparatus, not only in the UNI or the NNI at an entrance of an ATM network, but also in an exchange in the network, for example, in Japanese Patent Laid-Open Application No. Heisei 4-100342.

However, in such a conventional traffic shaping apparatus for the CBR service or the VBR service as described above, the rate (shaping cell rate) for sending of cells of the traffic shaping apparatus is determined based on a set peak cell rate (PCR) and a sustainable cell rate (SCR). Consequently, the shaping cell rate is fixed within a call setting period. Accordingly, the conventional traffic shaping apparatus Is disadvantageous in that, when the sending cell rate of a terminal varies, it cannot respond well to the rate variation.

Further, since the conventional traffic shaping apparatus for the CBR service or the VBR service does not have a function of acquiring from the network, information of sending cell rates of a terminal at the present and in the future, it Is disadvantageous in that it cannot detect a rate variation of a terminal. Consequently, the conventional traffic shaping apparatus for the CBR service or the VBR service cannot predict a rate variation of a terminal. As a result, the traffic shaping apparatus for the CBR service or the VBR service is disadvantageous also in that it cannot be used as it is for the ABR service.

Further, conventionally proposed apparatus which provide ABR service traffic do not involve traffic shaping in a network. For example, as an ATM communication apparatus which can provide ABR service traffic, a terminal and an exchange which can handle traffic of the ABR service are disclosed, for example, in Japanese Patent Laid-Open Application No. HEISEI 7-297843.

However, policing and traffic shaping for the ABR service have not been proposed as yet.

Accordingly, the ATM communication apparatus which can provide ABR service traffic described above cannot solve the problems in regard to the ABR service described above since traffic cannot be shaped intermediately of the network.

SUMMARY OF THE INVENTION

It is an object of the present invention to provide a dynamic traffic shaping apparatus usable for the ABR service which allows dynamic shaping processing wherein the shaping cell rate is varied dynamically in response to a rate variation of a terminal acquired from a network.

In order to attain the object described above, according to the present invention, there is provided a dynamic traffic shaping apparatus which is installed in an ATM network which provides an available bit rate service wherein band management is effected with a resource management cell, and sends out an arrival cell arriving from a transmission terminal side to a reception terminal side adjusting an interval of the cell from a preceding cell for each virtual path and each virtual channel, comprising a cell buffer for temporarily storing the arrival cell arriving from the transmission terminal side for each virtual path and each virtual channel, a write control section for storing the arrival cell into the cell buffer in response to a virtual path identifier and a virtual channel identifier of the arrival cell, a rate information processing section for predicting a sending rate of the transmission terminal in response to rate control information detected from a cell directed from the reception terminal side toward the transmission terminal side and successively storing the sending rate in an updating manner as sending rate information of the arrival cell for the virtual path and the virtual channel, and a read control section for reading out the cell stored in the cell buffer at an interval based on the sending rate information stored in the rate information processing section corresponding to the virtual path and the virtual channel and sending out the cell to the reception terminal side.

In the dynamic traffic shaping apparatus, an arrival cell arriving from the transmission terminal side is stored into the cell buffer based on a virtual path and a virtual channel thereof by the write control section. Meanwhile, the rate information processing section predicts a sending rate of the transmission terminal in response to rate control information detected from a cell directed from the reception terminal side to the transmission terminal side, and the sending rate is successively stored in an updating manner as sending rate information of the arrival cell for the virtual path and the virtual channel. Then, the read control section reads out the cell stored in the cell buffer at an interval based on the sending rate information stored in the rate information processing section corresponding to the virtual path and the virtual channel to the reception terminal side.

Consequently, with the dynamic traffic shaping apparatus, dynamic shaping processing wherein a cell is sent out to the reception terminal side based on the shaping cell rate successively updated with the rate information from the network can be performed. Consequently, even if the sending cell rate of a terminal is varied, the dynamic traffic shaping apparatus can operate in conformity with the rate variation comparing with an ordinary traffic shaping apparatus wherein the shaping cell rate is fixed within a call setting period.

The dynamic traffic shaping apparatus may be constructed such that the rate control information processing section predicts a sending rate of the transmission terminal from an explicit rate to the transmission terminal detected from a resource management cell directed from the reception terminal to the transmission terminal, and successively stores the sending rate in an updating manner as sending rate information of the arrival cell for the virtual path and the virtual channel.

In the dynamic traffic shaping apparatus, a sending rate of the transmission terminal is predicted from an explicit rate to the transmission terminal detected from a resource management cell directed from the reception terminal to the transmission terminal by the rate control information processing section, and the sending rate is successively stored in an updating manner as sending rate information of the arrival cell for the virtual path and the virtual channel. Accordingly, the sending rate of the transmission terminal can be predicted readily and rapidly, and a delay of the rate variation can be reduced.

Or, the dynamic traffic shaping apparatus may be constructed such that the rate control information processing section predicts a sending rate of the transmission terminal based on any of or any combination of an arrival time, a type and information in a payload of a cell detected from a cell directed from the reception terminal to the transmission terminal, and successively stores the sending rate in an updating manner as sending rate information of the arrival cell for the virtual path and the virtual channel.

In the dynamic traffic shaping apparatus, a sending rate of the transmission terminal is predicted by the rate control information processing section based on any of or any combination of an arrival time, a type and information in a payload of a cell detected from a cell directed from the reception terminal to the transmission terminal, and the sending rate is successively stored in an updating manner as sending rate information of the arrival cell for the virtual path and the virtual channel. Consequently, the accuracy in prediction of the sending rate of the transmission terminal is improved, and further precise shaping rate control can be achieved.

Otherwise, the dynamic traffic shaping apparatus may be constructed such that the rate control information processing section successively stores a sending rate of the transmission terminal predicted based on rate control information detected from a cell directed from the reception terminal side to the transmission terminal side and an application start time of the sending rate calculated from a delay time set by the network side in a updating manner in pair as sending rate information of the arrival cell for the virtual path, and the virtual channel, and the read control section selects sending rate information based on the application start times of sending rate information stored in the rate information processing section corresponding to the virtual path and the virtual channel, reading out the cell stored in the cell buffer at an interval based on the selected sending rate information and sending out the cell to the reception terminal side.

In the dynamic traffic shaping apparatus, a sending rate of the transmission terminal predicted based on rate control information detected from a cell directed from the reception terminal side to the transmission terminal side and an application start time of the sending rate calculated from a delay time set by the network side are successively stored in an updating manner in a pair as the sending rate information of the arrival cell, for the virtual path, and the virtual channel, by the rate control information processing section. Then, by the read control section, sending rate information is selected based on the application start times of sending rate information stored in the rate information processing section corresponding to the virtual path and the virtual channel, and the cell stored in the cell buffer is read out at an interval based on the selected sending rate information and send out to the reception terminal side. Consequently, shaping rate control can be effected substantially at the same timing as that of actual control of the sending rate by the transmission terminal.

Or else, the dynamic traffic shaping apparatus may be constructed such that the rate control information processing section successively stores a sending rate of the transmission terminal predicted based on rate control information detected from a cell directed from the reception terminal side to the transmission terminal side in an updating manner as latest sending rate information of the arrival cell corresponding to the virtual path and the virtual channel, and the read control section reads out the cell stored in the cell buffer at an interval based on the latest sending rate information stored in the rate information processing section corresponding to the virtual path and the virtual channel and sending out the cell to the reception terminal side.

In the dynamic traffic shaping apparatus, a sending rate of the transmission terminal predicted based on rate control information detected from a cell directed from the reception terminal side to the transmission terminal side is successively stored in an updating manner as latest sending rate information of the arrival cell corresponding to the virtual path and the virtual channel by the rate control information processing section. Then, the cell stored in the cell buffer is read out by the read control section at an interval based on the latest sending rate information stored in the rate information processing section corresponding to the virtual path and the virtual channel and is sent out to the reception terminal side. Consequently, the amount of transmission rate information can be reduced. Further, the rate variation timing of the shaping apparatus and the variation timings of the monitoring rates of a UPC and an NPC can be controlled independently of a time variation of the rate variation timing of a terminal or a propagation delay variation. Accordingly, the time required to vary the monitoring rate after information of rate variations of the UPC and the NPC is acquired can always be kept minimized.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a flow chart illustrating an ER record addition procedure of the rate information processing section shown in FIG. 1;

FIG. 12 is a diagrammatic view showing a conventional ATM network which can provide the ABR service.

DESCRIPTION OF THE PREFERRED EMBODIMENT

Figure 1:
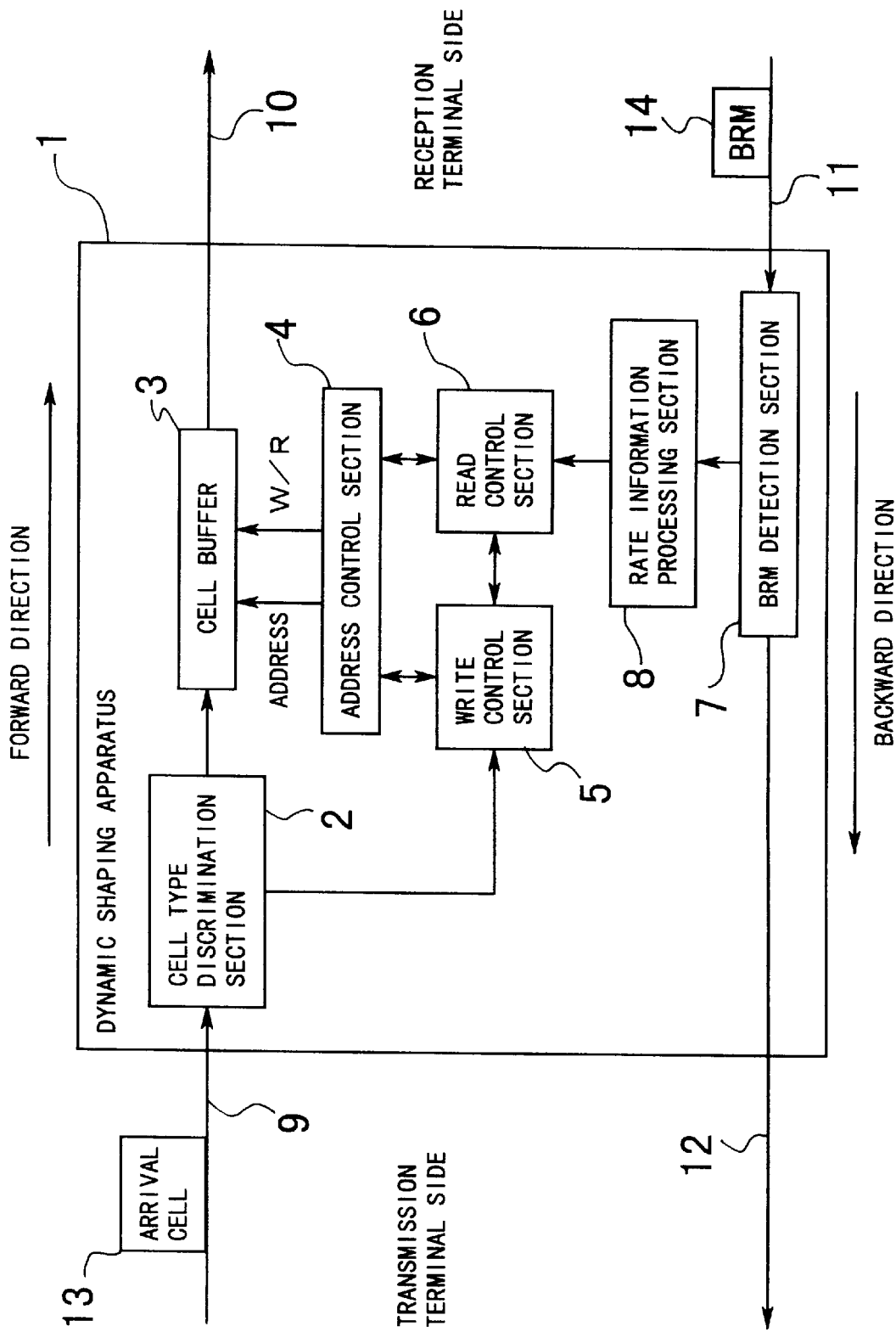
FIG. 1 is a block diagram of a dynamic shaping apparatus to which the present invention is applied.

Referring to FIG. 1, there is shown in block diagram a dynamic shaping apparatus to which the present invention is applied. The dynamic shaping apparatus is generally denoted at 1 and connected to transmission lines 9 to 12. The dynamic shaping apparatus 1 includes a cell type discrimination section 2 for discriminating a type of an arrival cell 13 which arrives from a transmission terminal via the transmission line 9 on the transmission terminal side, a cell buffer 3 for temporarily storing the arrival cell 13 from the transmission terminal, an address control section 4 for controlling the addresses for writing and reading out into and from the cell buffer 3, a write control section 5 for controlling writing into the cell buffer 3, a read control section 6 for controlling reading out from the cell buffer 3, a rate information processing section 8 for processing sending cell rate information of the transmission terminal for each connection, and a BRM detection section 7 for detecting a BRM (Backward Resource Management) cell.

The cell type discrimination section 2 discriminates, from the header of an arrival cell 13 from the transmission terminal, a virtual path identifier (VPI), a virtual channel identifier (VCI) and a payload type (PT).

The cell buffer 3 temporarily stores the arrival cell 13 from the transmission terminal and sends out such stored cells to the transmission line 10 on the reception terminal side adjusting the intervals between the cells to a prescribed value. The write and read controls of the arrival cell 13 into and from the cell buffer 3 are performed by the write control section 5 and the read control section 6, respectively, via the address control section 4.

The address control section 4 manages addresses of cells stored in the cell buffer 3 so that the cells may form a virtual queue for each connection classified with the VPI and the VCI, and effects writing or reading out of a cell in response to a cell write request from the write control section 5 or a cell read-out request from the read control section 6.

The write control section 5 effects writing control of the arrival cell 13 from the transmission terminal.

The read control section 6 effects read-out control of cells stored in the cell buffer 3 based on cell interval information for each connection obtained from the rate information processing section 8 and schedule management information for sending out of cells.

The BRM detection section 7 discriminates a VPI, a VCI and a PT from the header of an arrival cell arriving thereto from the reception terminal via the transmission line 11 on the reception terminal side to extract an arrival time and a type of the cell and information in the payload of the cell and reports the extracted information to the rate information processing section 8.

Particularly, if the BRM detection section 7 detects a backward RM cell (BRM cell) 14, then it extracts explicit rate information (ER information) described in the cell and a CI (Congestion Indication) or an NI (No Increase) which are congestion information, and reports the extracted information to the rate information processing section 8.

Further, the BRM detection section 7 sends out the discriminated cell transparently to the transmission line 12 on the transmission terminal side.

The rate information processing section 8 manages sending cell rate information of the transmission terminal for each connection and reports cell interval information in response to a request from the read control section 6.

Subsequently, details of the rate information processing section 8 and the read control section 6 will be described with reference to FIGS. 2 to 4.

Figure 2:
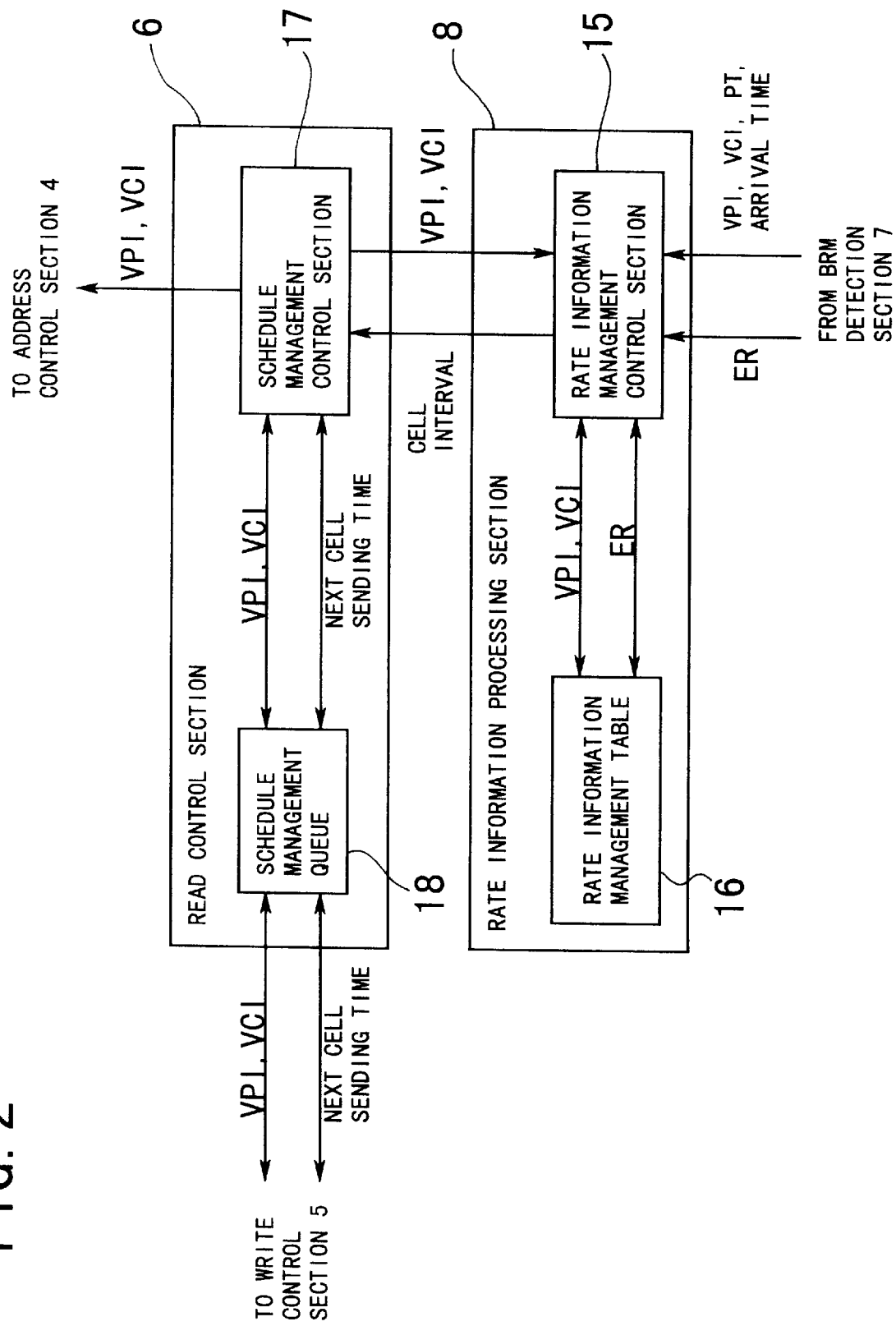
FIG. 2 is a block diagram showing details of a read control section and a rate information processing section shown in FIG. 1.

Referring first to FIG. 2 in which details of the rate information processing section 8 and the read control section 6 are shown, the rate information processing section 8 includes a rate information management control section 15 and a rate information management table 16.

The rate information management control section 15 effects processing for determination of a shaping cell rate in response to VPI and VCI information and ER information received from the BRM detection section 7 of FIG. 1. Further, the rate information management control section 15 effects control for recording VPI, VCI and ER information into the rate information management table 16 and processing for conversion of the determined shaping cell rate into cell interval information in response to a request for VPI and VCI information and cell interval information and reporting of the resulting cell interval information to the read control section 6.

Figure 3:
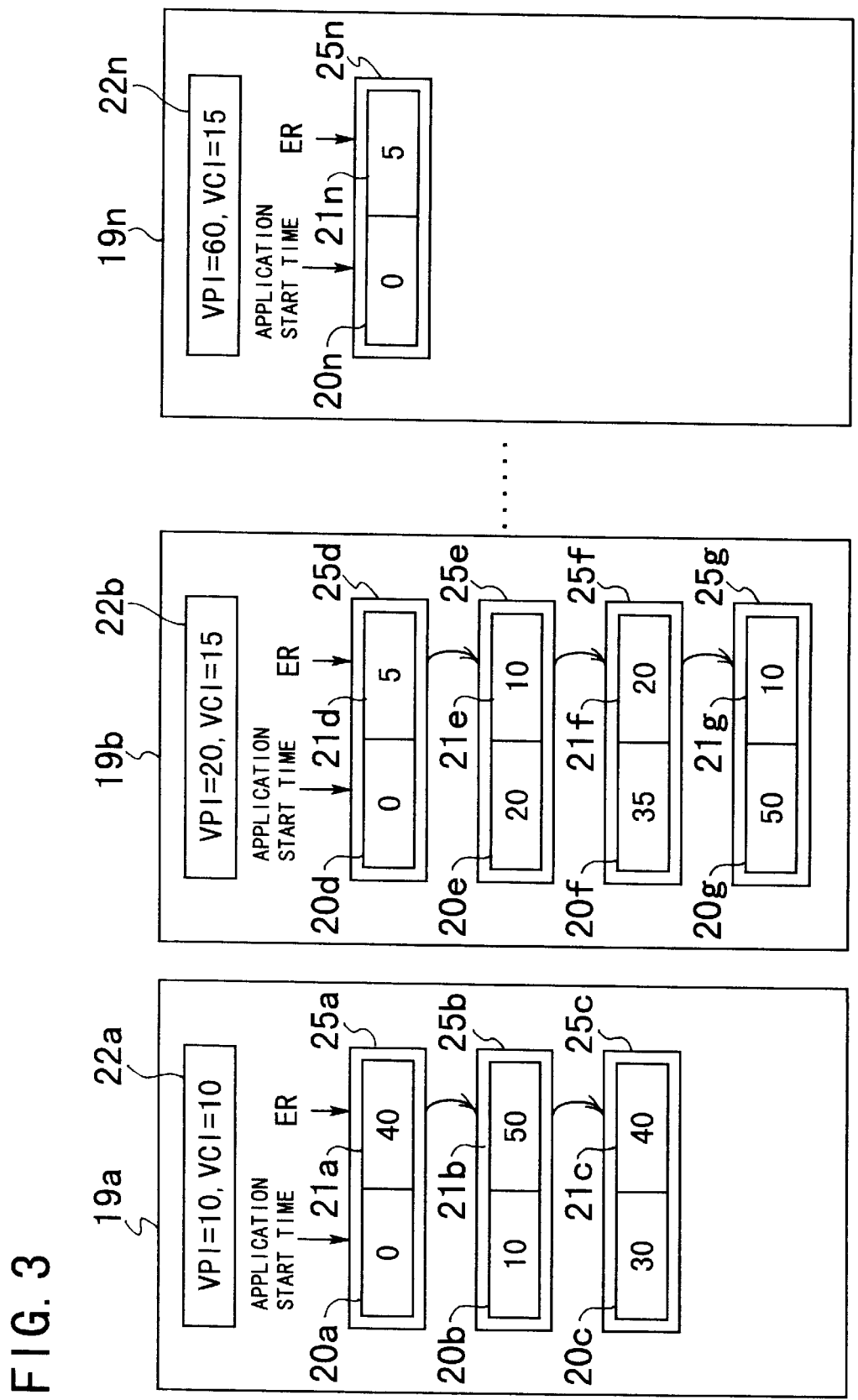
FIG. 3 is a diagrammatic view showing an example of a construction of a rate information management table shown in FIG. 2.

Referring now to FIG. 3, the rate information management table 16 includes, where the number of connections set is n, individual information management tables 19a, 19b, . . . , 19n for the individual connections. In the example shown in FIG. 3, n=3.

The individual information management tables 19 (19a to 19n) include VPI and VCI information fields 22a to 22n, respectively, and ER records 25a to 25n. Further, the ER records 25a to 25n include application start time fields 20a to 20n and ER fields 21a to 21n, respectively.

The ER fields 21a to 21n store ER information extracted from BRM cells 14 in the arriving order of the BRM cells 14. The application start time fields 20a to 20n store at which information of the corresponding ER fields 21a to 21n should be rendered effective.

Referring back to FIG. 2, the read control section 6 includes a schedule management control section 17 and a schedule management queue 18.

The schedule management control section 17 effects control for recording cell sending order information of each connection into the schedule management queue 18 in response to cell interval information received from the rate information processing section 8 and presentation of VPI and VCI information of cells to be sent out to the address control section 4.

Figure 4:
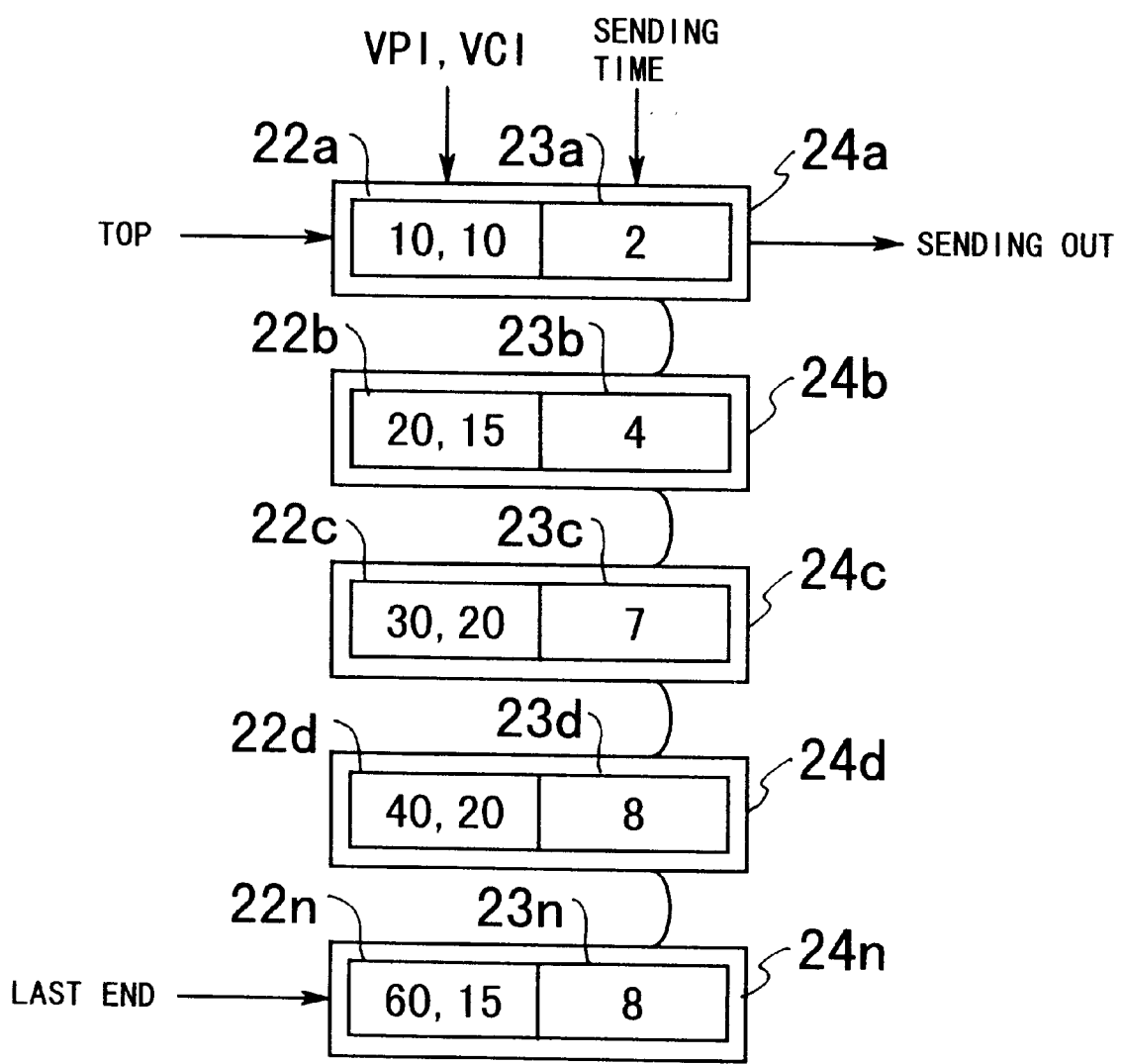
FIG. 4 is a block diagram showing an example of a construction of a schedule management queue shown in FIG. 2.

Referring to FIG. 4, the schedule management queue 18 includes schedule management records 24a to 24d and 24n for individual connections. In the example shown in FIG. 4, n=5.

The schedule management records 24a to 24d and 24n include VPI and VCI information fields 22a to 22d and 22n and cell sending time fields 23a to 23d and 23n, respectively. The VPI and VCI information fields 22 (22a to 22d and 22n) store VPI and VCI values of the corresponding connections. The cell sending time fields 23 (23a to 23d and 23n) store cell sending times of those connections indicated by the corresponding VPI and VCI information fields 22.

Subsequently, operation of the dynamic shaping apparatus 1 having the construction described above will be described.

First, operation of the dynamic shaping apparatus 1 will be described by way of an example wherein a cell sent out from the transmission terminal and propagated along the transmission line 9 from the transmission terminal side arrives at the dynamic shaping apparatus 1 with reference to FIGS. 5(a) and 5(b) which illustrate a new connection discrimination procedure and a new connection initial registration procedure in a connection initial registration operation of the write control section 5 in the dynamic shaping apparatus 1 described above.

When an arrival cell 13 from the transmission terminal, having propagated along the transmission line 9 on the transmission terminal side arrives at the dynamic shaping apparatus 1, the dynamic shaping apparatus 1 discriminates the VPI and the VCI of the arrival cell 13 by means of the cell type discrimination section 2 and reports a result of the discrimination to the write control section 5. In response to the report, the write control section 5 effects such scheduling initial registration procedure as illustrated in FIG. 5(a).

Figure 5A:
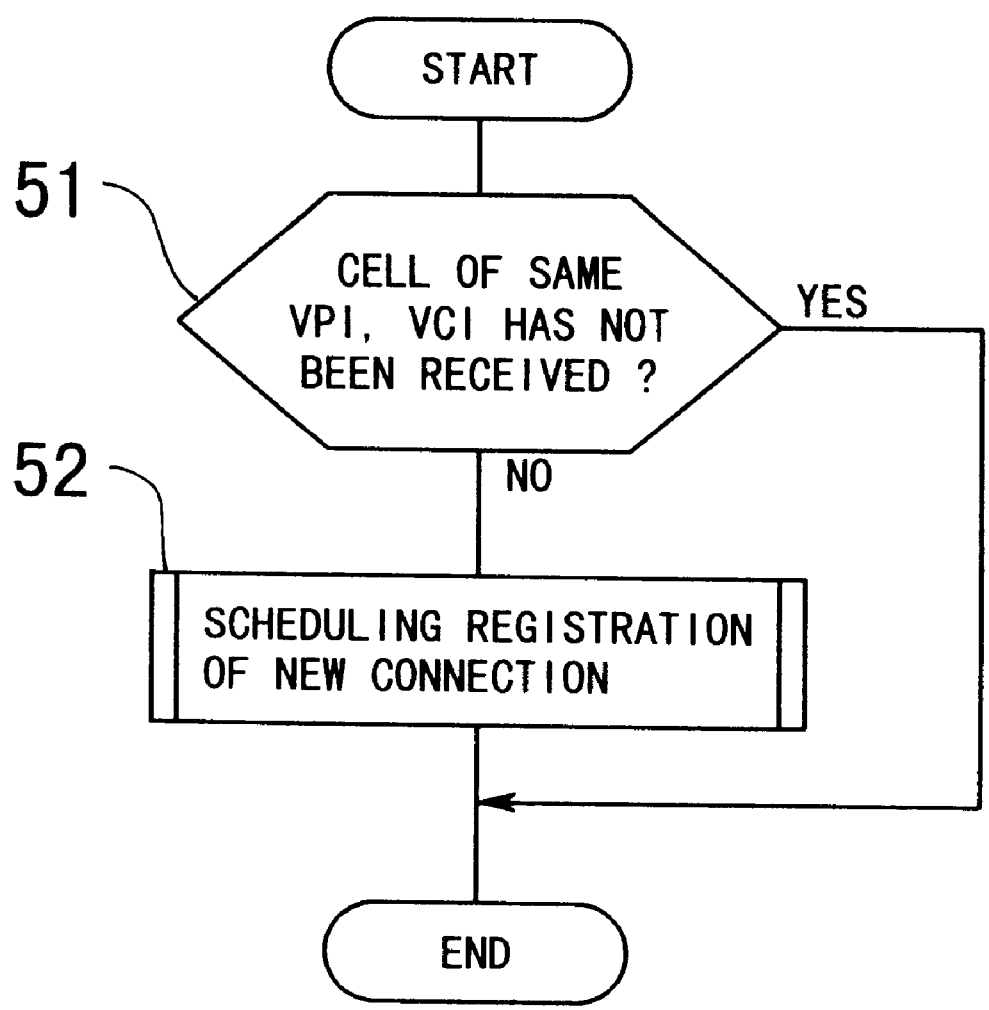
FIGS. 5(a) and 5(b) are flow charts illustrating a connection initial registration procedure of a write control section shown in FIG. 1.

In particular, referring to FIG. 5(a), the write control section 5 first discriminates whether or not a cell of the same connection as that of the arrival cell 13 has arrived till then (step 51). Then, if no such cell has arrived (NO in step 51), then the write control section 5 effects such registration of a new connection to the schedule management queue 18 as illustrated in FIG. 5(a) (step 52).

Here, a registration procedure for a new connection will be described with reference to FIG. 5(b).

The write control section 5 first produces a new schedule management record 24 based on the VPI and the VCI of the arrival cell 13 reported from the cell type discrimination section 2 (step 53).

Then, the write control section 5 sets a cell sending time with the current point of time into a cell sending time field 23 of the schedule management record 24 (step 54), and sets the VPI and VCI values of the corresponding connection into the VPI and VCI information field 22 (step 55).

Then, the write control section 5 stores the new record produced in this manner as a schedule management record 24n to the end of the last record group of those schedule management records 24 of the schedule management queue 18 in which the values of the cell sending time fields 23 are equal as seen in FIG. 4 (step 56), thereby ending the processing.

Accordingly, since, for example, in FIG. 4, the cell sending time 23n of the schedule management record 24n to be registered newly is "8", the new schedule management record 24n is stored following the end of the last schedule management record 24d in which the same cell sending time "8" is set.

It is to be noted that, if a cell which has arrived already is discriminated in the new connection discrimination processing step 51 shown in FIG. 5(a) (YES in step 51), the write control section 5 ends its scheduling initial registration operation.

After the cell discrimination procedure by the cell type discrimination section 2 (refer to FIG. 1) is completed and the connection initial registration procedure by the write control section 5 are completed in this manner, the arrival cell 13 from the transmission terminal is stored into the cell buffer 3 under the control of the address control section 4 and the write control section 5.

Subsequently, operation of the dynamic shaping apparatus 1 when a cell sent out from the reception terminal arrives at the dynamic shaping apparatus 1 via the transmission line 11 on the reception terminal side will be described with reference to FIG. 6 which illustrates in a flow chart an ER recording addition procedure to the rate information management table 16 of the rate information processing section 8 in the dynamic shaping apparatus 1 described hereinabove.

When a cell sent out from the reception terminal arrives at the dynamic shaping apparatus 1 via the transmission line 11 on the reception terminal side, the dynamic shaping apparatus 1 discriminates the VPI, the VCI and the PT of the arrival cell by means of the BRM detection section 7.

If the BRM detection section 7 discriminates a BRM cell 14 as a result of the discrimination, then the BRM detection section 7 extracts ER information from the detected BRM cell 14 and reports the ER information to the rate information processing section 8 together with the VPI and VCI information. Further, the BRM detection section 7 sends out the discriminated cell immediately to the transmission line 12 on the transmission terminal side.

Upon reception of the report from the BRM detection section 7, the rate information processing section 8 effects such an ER record addition procedure to the rate information management table 16 as illustrated in FIG. 6.

Referring to FIG. 6, the rate information processing section 8 selects, based on the VPI and VCI information, one of the individual information management tables 19 (refer to FIG. 3) which corresponds to the relevant connection (step 61), and compares the ER acquired now with another ER recorded in the ER field 21 of the latest ER record 25 at the last end of the selected individual information management table 19 (step 62).

Here, if the last ER and the current ER are equal to each other (NO in step 62), then the rate information processing section 8 ends its processing without performing a new ER record adding operation.

On the contrary, if the last ER and the current ER are different from each other (YES in step 62), the rate information processing section 8 determines an application start time at which the current ER should be rendered effective (step 63). It is to be noted that the application start time is set to a value of the current time to which the fixed delay $\tau 3$ set on the network side is added.

Then, the current ER and the application start time are recorded into the ER field 21 and the application start time field 20 of the ER record 25, respectively, and adds the new ER record 25 to the last end of the individual information management table 19 (step 64), thereby ending the processing.

Therefore, for example, if the VPI and the VCI reported from the BRM detection section 7 are VPI=20 and VCI=15, then the individual information management table 19b is selected from the rate information management table 16 as seen from FIG. 3.

Further, if the latest ER record of the individual information management table 19b is the ER record 25f (last ER=20) and ER=10 (current ER) is reported from the BRM detection section 7, then since the two ER values are different from each other, the application start time for the current ER (=current point of time+delay $\tau 3$) is calculated, and a new ER record 25g having the ER values and the application start time in the ER field 21g and the application start time field 20g, respectively, is added to the last end of the individual information management table 19b.

Subsequently, operation of the dynamic shaping apparatus 1 when a cell is sent out from the dynamic shaping apparatus 1 to the transmission line 10 on the reception terminal side will be described with reference to FIGS. 7(a) and 7(b) which illustrate, in flow charts, a cell sending procedure and a next cell scheduling procedure, respectively, by the read control section 6, rate information processing section 8, cell buffer 3 and address control section 4 of the dynamic shaping apparatus 1 described above.

The dynamic shaping apparatus 1 sends out a cell in synchronism with a cell slot of the transmission line 10. In this instance, if cells which can be sent out are present in the cell buffer 3, a cell is selectively sent out from the cell buffer 3. On the other hand, if the cell buffer 3 has no such cell, it sends out an idle cell. To this end, a search for cells in the cell buffer 3 which can be sent out is performed as seen in FIG. 7(a).

First, when a cell sending timing comes, the schedule management queue 18 (refer to FIGS. 2,4) checks registered connections (step 71). If the schedule management queue 18 has no connection registered for a schedule (NO in step 71), then the schedule management queue 18 discriminates that the cell buffer 3 does not have a cell which can be sent out, thereby ending the processing.

On the other hand, if the schedule management queue 18 has a connection registered for a schedule therein (YES in step 71), then the top schedule management record 24 (of FIG. 4) in the schedule management queue 18 is referred to (step 72).

Then, the current point of time is compared (step 73) with the cell sending time field 23 of the schedule management record 24 referred to by (step 72). Here, if the cell sending time is later than (in the future with respect to) the current point of time (NO in step 73), then it is determined that the cell buffer 3 does not have a cell which can be sent out, thereby ending the processing.

On the other hand, if the cell sending time is earlier than (in the past with respect to) the current point of time (YES in step 73), then it is checked whether or not the cell buffer 3 has a cell of the relevant connection stored therein (step 74).

Figure 7A:
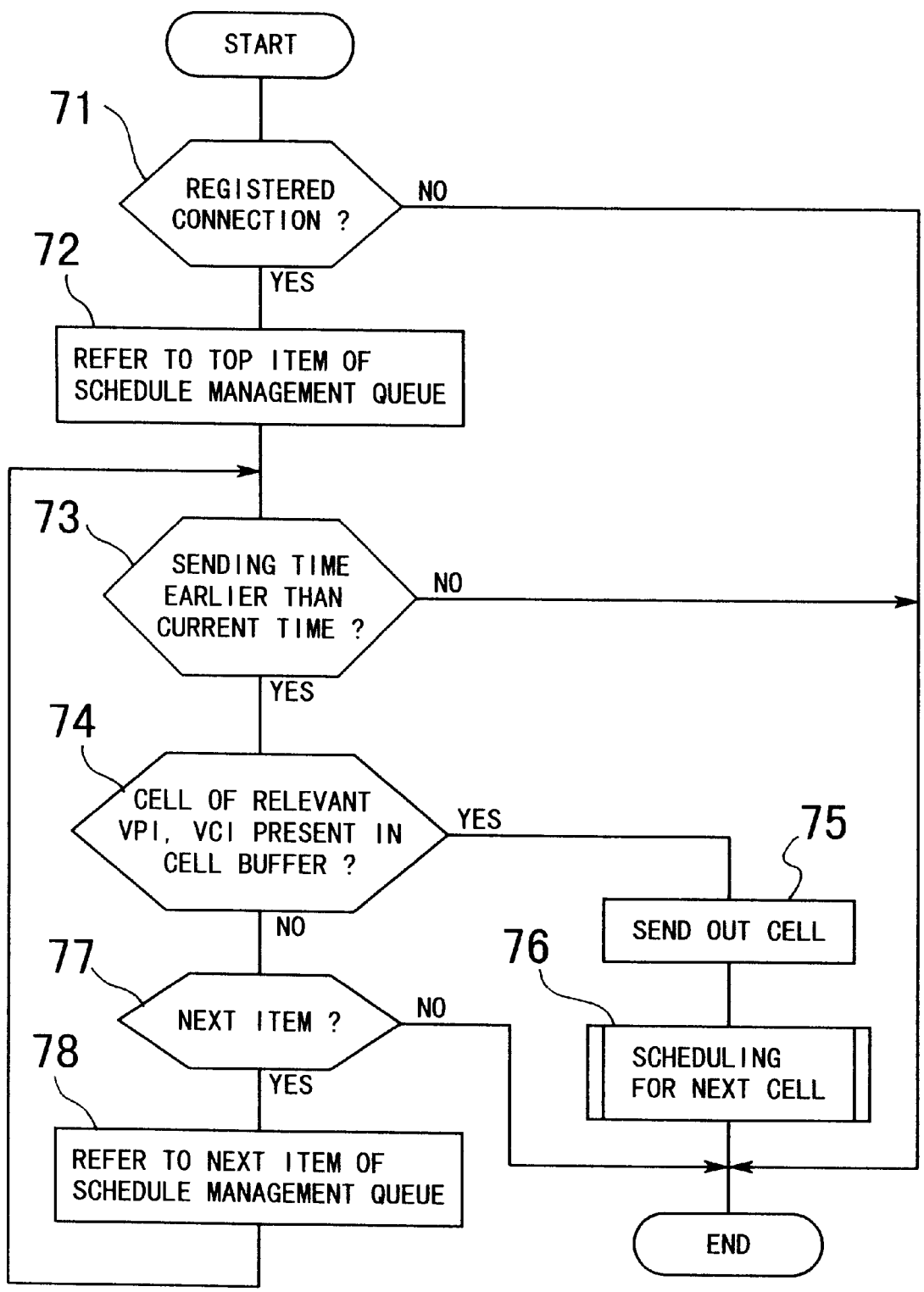
FIGS. 7(a) and 7(b) are flow charts illustrating a cell sending procedure by the control section, the rate information processing section, a cell buffer and an address control section shown in FIG. 1.
Figure 7B:
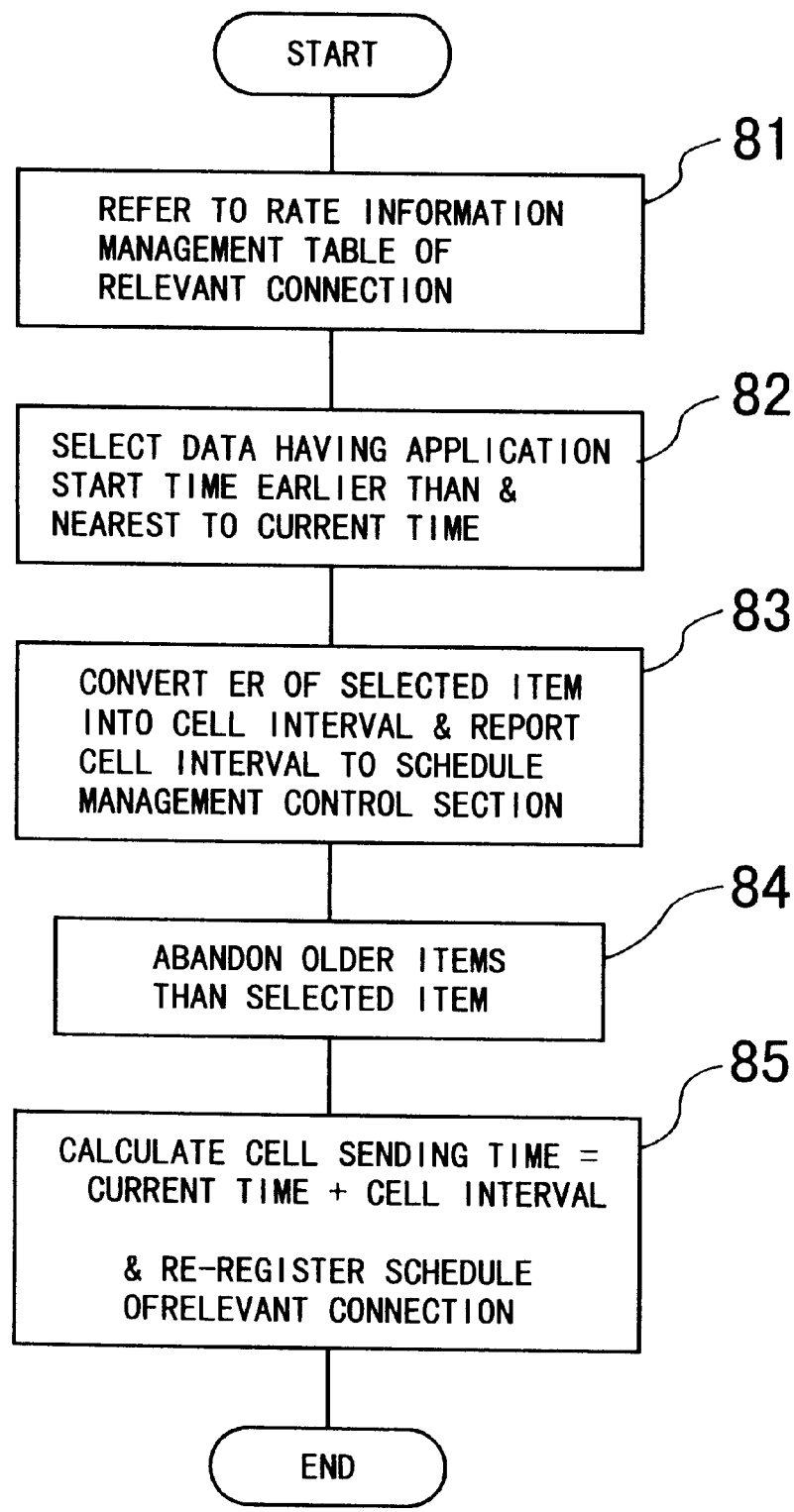

If a cell of the relevant connection is present in the cell buffer 3 (YES in step 74), then the cell of the relevant connection is sent out (step 75), and then such cell scheduling procedure as described below with reference to FIG. 7(b) is effected, thereby ending the processing (step 76).

Here, the next cell scheduling procedure will be described.

Referring to FIG. 7(b), the individual information management table 19 (refer to FIG. 3) of the relevant connection to the cell sent out is selected from within the rate information management table 16 (of FIG. 2) (step 81), and an ER record 25 whose application start time 20 at which the ER becomes effective is nearest to the application start time 20 is selected from among those ER records 25 which are older or earlier than the current point of time (step 82).

The value of the ER field 21 of the selected ER record 25 is converted into a cell interval and the cell interval is reported to the read control section 6 (step 83), and any ER record 25 which has an application start time earlier than that of the selected ER record 25 is abandoned (step 84).

Accordingly, if, for example, in FIG. 3, the individual information management table 19a is selected from within the rate information management table 16 and the current point of time is "15", then the ER record 25b whose application start time field 20b is "10" is selected, and the value of the ER field 21b of the selected ER record 25b is converted into a cell interval, which is reported to the read control section 6.

Further, the ER record 25a is aba ndoned since the application start time field 20a thereof is earlier than the application start time field 20b of the ER record 25b which is "10".

Then, the read control section 6 calculates a new cell sending time based on the expression of cell sending time= current point of time+cell interval, and re-registers the schedule of the relevant connection into the schedule management queue 18 (refer to FIGS. 2,4) (step 85).

In this instance, similar to the new registration described above, the re-produced record is stored at the end of the last record group having an equal value in the cell sending time fields 23 in the schedule management records 24 of the schedule management queue 18, thereby ending the processing.

On the other hand, if the cell buffer 3 does not have a cell of the relevant connection in step 74 of the cell sending procedure illustrated in FIG. 7(a) (NO in step 74), presence of a next schedule management record 24 is confirmed based on the schedule management queue 18 (refer to FIGS. 2,4) (step 77).

Here, if a next schedule management record 24 is present (YES in step 77), then the next schedule management record 24 is referred to (step 78). Then, the control sequence returns to step 73.

On the other hand, if no next schedule management record 24 is present (NO in step 77), then it is determined that a cell which can be sent out is not present in the cell buffer 3, thereby ending the procedure.

Figure 5B:
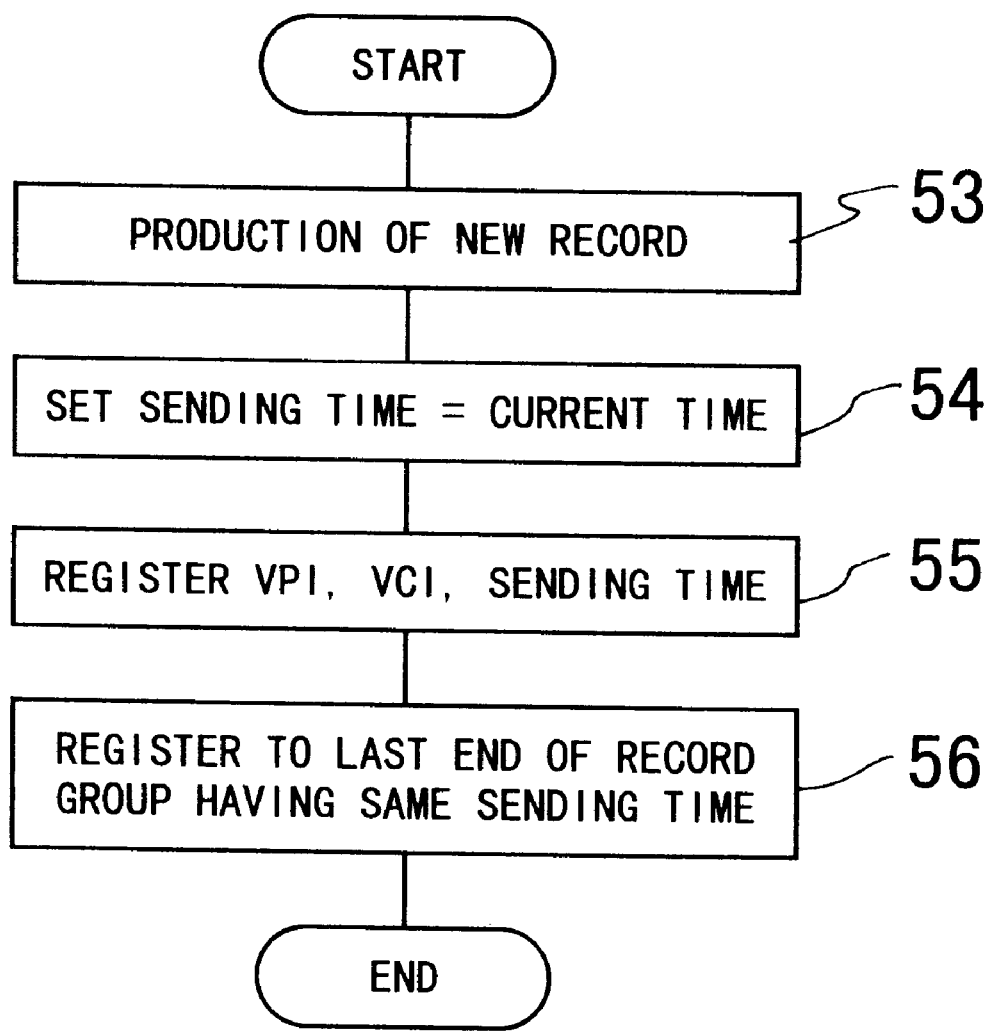

In this manner, with the dynamic shaping apparatus 1 according to the embodiment of the present invention described above, since it effects the storage procedure of an arrival cell from the transmission terminal (refer to FIGS. 5(a) and 5(b)), the rate information collection procedure by reception of a BRM cell from the reception terminal (refer to FIG. 6) and the cell sending control from the transmission terminal based on the collected rate information (refer to FIGS. 7(a) and 7(b)), it is possible to effect dynamic shaping processing of sending out a cell to the transmission line 10 on the reception terminal side based on a shaping cell rate successively updated based on the rate information from the network. Consequently, when compared with a conventional shaping apparatus wherein the shaping cell rate is fixed within a call setting period, even if the sending cell rate of a terminal varies, the traffic shaping apparatus can cope with the rate variation.

Further, since a sending rate of the transmission terminal, that is predicted based on rate control information, and an application start time for the sending rate, calculated from a predetermined delay time set by the network side, are successively stored in an updating manner in a pair as the sending rate information of an arrival cell for each virtual path and each virtual channel, and some sending rate information is selected based on the application start times of the information of the individual sending rates, and then cells are read out at predetermined intervals of time based on the sending rate information and sent out to the reception terminal side, the shaping rate control can be effected substantially at the same timing as that defined by an actual sending rate by the transmission terminal.

Further, since a sending rate of the transmission terminal is predicted from an explicit rate to the transmission terminal, detected from a resource management cell directed from the reception terminal to the transmission terminal, and this sending rate is successively stored in an updating manner as sending rate information of an arrival cell for each virtual path and each virtual channel, the sending rate of the transmission terminal can be predicted readily and rapidly and the delay of the rate variation can be reduced.

Subsequently, a modification to the dynamic shaping apparatus 1 of the embodiment of the present invention will be described. The modified dynamic shaping apparatus is different from the dynamic shaping apparatus 1 of the embodiment described above, in the contents of the ER fields 21 of the rate information management table 16 in the rate information processing section 8 and operation of the rate information management control section 15.

In particular, the rate information management control section 15 (refer to FIG. 2) in the modified dynamic shaping apparatus receives not only ER information but also an arrival time of a cell from the BRM detection section 7, a type of the cell and information in the payload of the cell, effects rate control same as that of the transmission terminal based on congestion information of the network such as a cell arrival interval or information in the payload and effects processing for determination of a shaping cell rate.

It is to be noted that the algorithm for the rate control conforms with the source behavior and the destination behavior of the ABR service described in the ATM Forum TM 4.0.

Further, in the modified dynamic shaping apparatus, shaping cell rates successively determined by the rate information management control section 15 are an successively stored into the ER fields 21 (refer to FIG. 3) in the rate updating order.

Using the rate information processing section 8 having the modified construction described above, dynamic shaping processing is performed wherein cells which successively arrive from the transmission line 9 on the transmission terminal side and are to be sent out to the transmission line 10 on the reception terminal side, are sent out varying the shaping cell rate by the same rate control as that of the transmission terminal, by the storage procedure for an arrival cell from the transmission terminal (refer to FIGS. 5(a) and 5(b)), the rate information collection processing by reception of a BRM cell from the reception terminal (refer to FIG. 6) and the sending control of the cell from the transmission terminal based on the collected rate information (refer to FIGS. 7(a) and 7(b)), which are the operations of the dynamic shaping apparatus 1 of the embodiment described above.

In this manner, with the modified dynamic shaping apparatus, by receiving information of an arrival time of a cell from the BRM detection section 7, a type of the cell and information in the payload of the cell and effecting the same rate control as that of the transmission terminal based on congestion information of the network such as a cell arrival interval or the information in the payload, the prediction accuracy of the sending rate of the transmission terminal is improved comparing with that by the operations of the dynamic shaping apparatus 1 of the embodiment which effects sending rate prediction of the transmission terminal based only on ER information.

Accordingly, the modified dynamic shaping apparatus is advantageous, in addition to the advantages of the dynamic shaping apparatus 1 of the embodiment described above, in that more precise shaping rate control can be achieved comparing with the dynamic shaping apparatus 1 of the embodiment.

Subsequently, another modification to the dynamic shaping apparatus 1 of the embodiment of the present invention described above will be described. The second modified dynamic shaping apparatus is different from the dynamic shaping apparatus 1 of the embodiment in the construction of the rate information management table 16 in the rate information processing section 8 and operation of the rate information management control section 15.

Figure 8:
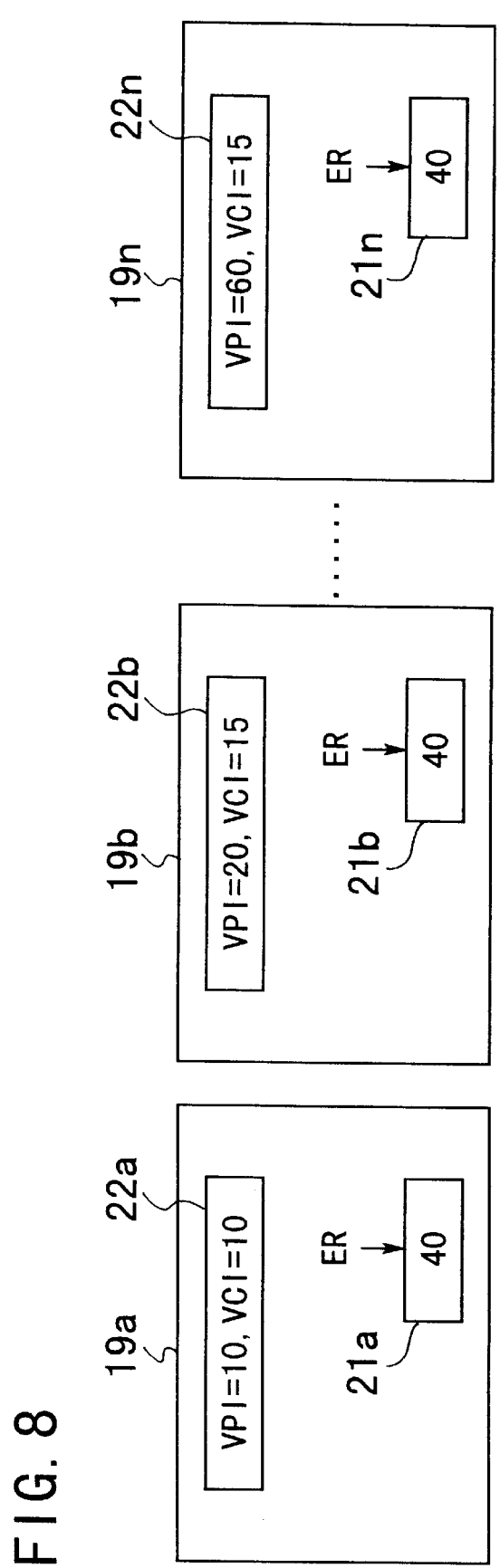
FIG. 8 is a diagrammatic view illustrating another example of a construction of the rate information management table which is employed by a modified dynamic shaping apparatus.

FIG. 8 shows in block diagram an example of a construction of the rate information management table 16 of the second modified dynamic shaping apparatus.

Referring to FIG. 8, the rate information management table 16 shown includes individual information management tables 19a, 19b and 19n provided for the individual connections. In the example shown in FIG. 8, n=3.

The individual information management tables 19 (19a, 19b and 19n) include VPI and VCI information fields 22a, 22b and 22n, and ER fields 21a, 21b and 21n, respectively.

Each of the individual information management tables 19 has a single ER field 21.

Operation of the second modified dynamic shaping apparatus will be described below with reference to FIGS. 9 to 11.

Operation of the dynamic shaping apparatus when a cell sent out from the transmission terminal arrives at the dynamic shaping apparatus is similar to that (refer to FIGS. 5(a) and 5(b)) of the dynamic shaping apparatus 1 of the embodiment described hereinabove, and overlapping description thereof is omitted here.

Figure 9:
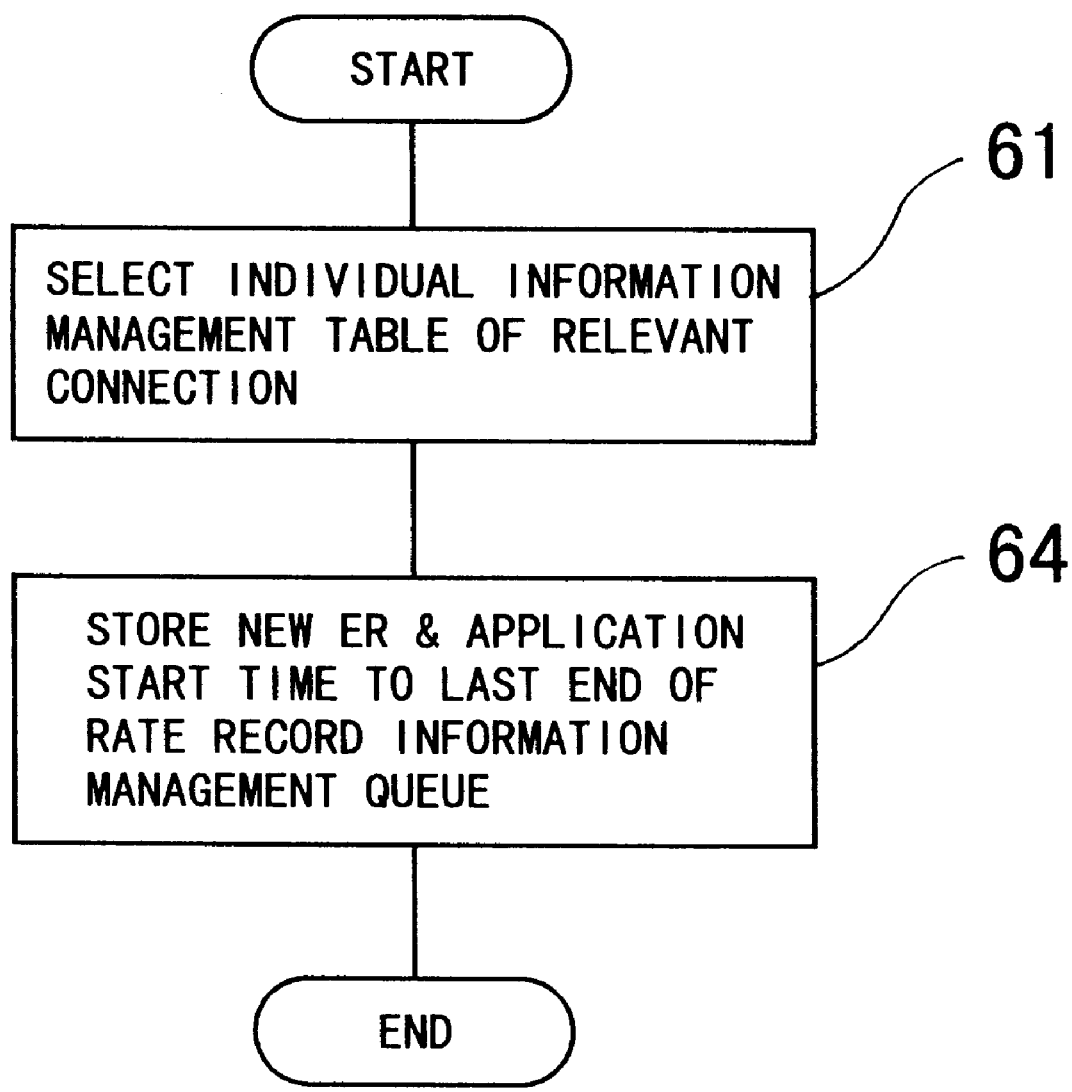
FIG. 9 is a flow chart illustrating an ER record addition procedure where the rate information management table shown in FIG. 8 is used.

On the other hand, when a cell sent out from the reception terminal arrives at the dynamic shaping apparatus, such ER record updating procedure as illustrated in FIG. 9 is effected by the rate information management table 16 of the rate information processing section 8.

In particular, reception of a cell from the reception terminal, detection of a BRM cell 14, extraction of ER information and reporting of the ER information and VPI and VCI information to the rate information processing section 8 are effected in a similar manner as in the dynamic shaping apparatus 1 described hereinabove with reference to FIGS. 5(a) and 5(b).

When the report from the BRM detection section 7 is received, the rate information processing section 8 effects the ER recording updating procedure for such a rate information management table as illustrated in FIG. 9.

Referring to FIG. 9, the rate information processing section 8 first selects one of the individual information management tables 19 which corresponds to the relevant connection in response to the VPI and VCI information (step 61). Then, the rate information processing section 8 updates the ER recorded in the ER field 21 in the selected individual information management table 19 with the ER acquired currently (step 64), thereby ending the procedure.

Figure 10:
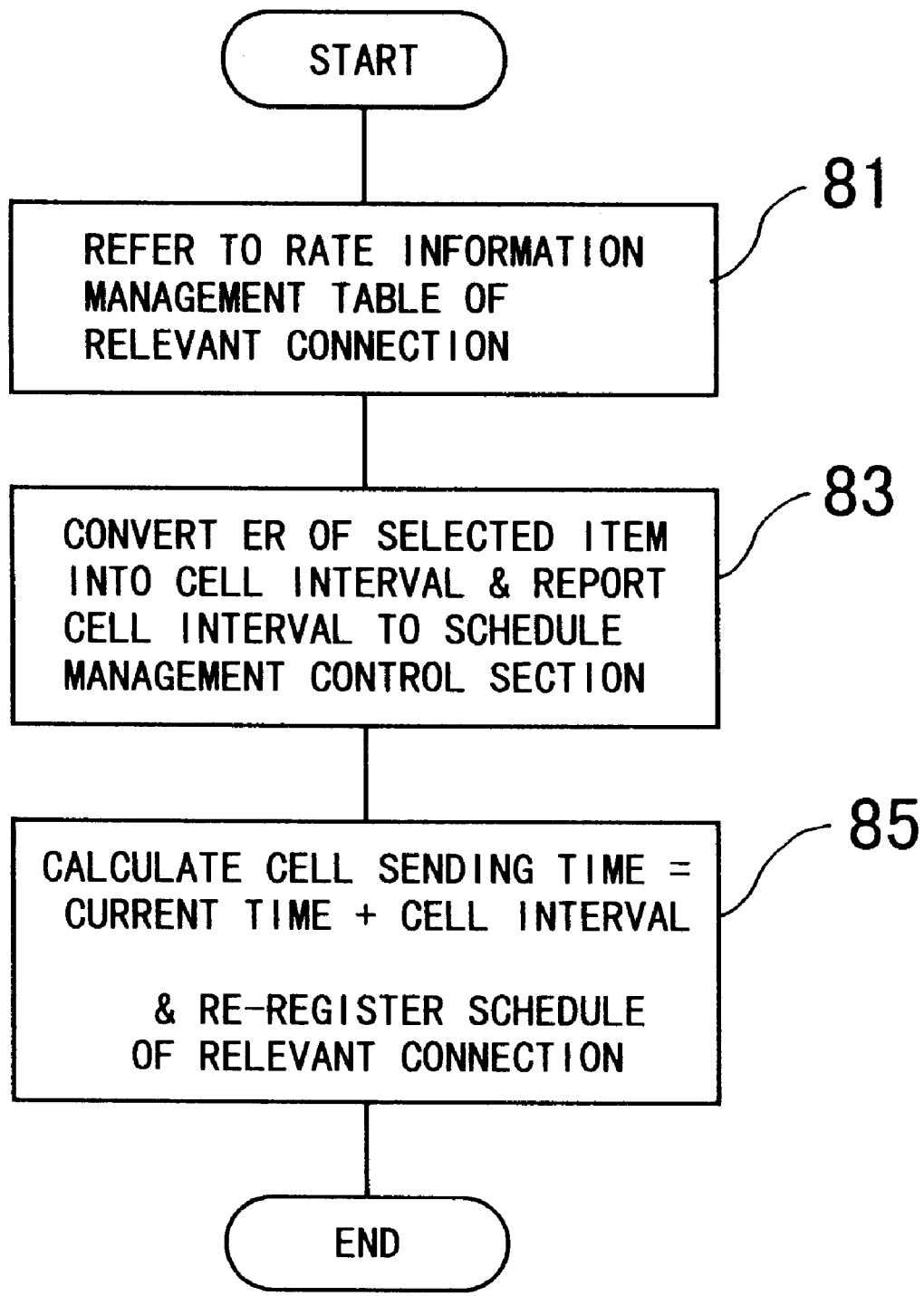
FIG. 10 is a flow chart illustrating a next cell scheduling procedure where the rate information management table shown in FIG. 8 is used.

On the other hand, when a cell is to be sent out from the dynamic shaping apparatus, such a next cell scheduling procedure as illustrated in FIG. 10 is effected by the read control section 6, rate information processing section 8, cell buffer 3 and address control section 4. It is to be noted that the searching procedure for a cell which can be sent out in the cell buffer 3 of the dynamic shaping apparatus 1 is similar to that of the dynamic shaping apparatus 1 except the next cell scheduling step (step 76) of the flow chart of FIG. 7(a).

Referring to FIG. 10, one of the individual information management tables 19 which corresponds to the connection relevant to a cell sent out is selected from within the rate information management table 16 (step 81). Then, the value of the ER field 21 in the selected individual information management table 19 is converted into a cell interval, and the cell interval is reported to the read control section 6 (step 83).

In response to the report, the read control section 6 calculates a new cell sending time in accordance with the expression of new cell sending time=current point of time+ cell interval, and re-registers the new cell sending interval into the schedule for the relevant connection (step 85).

In this manner, in the second modified dynamic shaping apparatus, by effecting the storage procedure of an arrival cell from the transmission terminal (refer to FIGS. 5(a) and 5(b)), the rate information collection procedure based on reception of a BRM cell from the reception terminal (refer to FIG. 9) and the cell sending control from the transmission terminal based on the collected rate information (refer to FIG. 10), the shaping cell rate is varied reflecting information of a sending cell rate of the terminal in the future on the shaping cell rate immediately after the information is acquired by the dynamic shaping apparatus.

Accordingly, the determination means for a time at which the shaping cell rate should be varied is simplified and the ER fields 21 managed in the individual information management tables 19 can be reduced to one for each one connection. Consequently, the individual information management tables 19 can be minimized.

Consequently, the rate variation timing of the shaping apparatus and the variation timing of the monitoring rates of the UPC and the NPC can be made independent of a time variation of the rate variation timing of the terminal or a propagation delay variation, and the time required to vary the monitoring rates after information of a rate variation by the UPC or the NPC can always be minimized.

Subsequently, a third modification to the dynamic shaping apparatus 1 of the embodiment of the present invention will be described. The modified dynamic shaping apparatus is a modification to and different from the second modified dynamic shaping apparatus described above, and is similar to the differences of the first modified dynamic shaping apparatus from the dynamic shaping apparatus 1 of the embodiment, the contents of the ER fields 21 of the rate information management table 16 in the rate information processing section 8 and operation of the rate information management control section 15.

In particular, the rate information management control section 15 (refer to FIG. 2) in the third modified dynamic shaping apparatus receives not only ER information but also an arrival time of a cell from the BRM detection section 7, a type of the cell and information in the payload of the cell, effects rate control same as that of the transmission terminal based on congestion information of the network such as a cell arrival interval or information in the payload and effects processing for determination of a shaping cell rate.

It is to be noted that the algorithm for the rate control conforms with the source behavior and the destination behavior of the ABR service described in the ATM Forum TM 4.0.

Further, in the third modified dynamic shaping apparatus, shaping cell rates successively determined by the rate information management control section 15 are successively stored into the ER fields 21 (refer to FIG. 3) in the rate updating order.

Using the rate information processing section 8 having the modified construction described above, dynamic shaping processing is performed wherein cells which successively arrive from the transmission line 9 on the transmission terminal side and are to be sent out to the transmission line 10 on the reception terminal side are sent out varying the shaping cell rate by the same rate control as that of the transmission terminal by the storage procedure for an arrival cell from the transmission terminal (refer to FIGS. 5(a) and 5(b)), the rate information collection processing by reception of a BRM cell from the reception terminal (refer to FIG. 9) and the sending control of the cell from the transmission terminal based on the collected rate information (refer to FIG. 10), which are the operations of the dynamic shaping apparatus 1 of the embodiment described above.

In this manner, with the third modified dynamic shaping apparatus, by receiving information of an arrival time of a cell from the BRM detection section 7, a type of the cell and information in the payload of the cell and effecting the same rate control as that of the transmission terminal based on congestion information of the network such as a cell arrival interval or the information in the payload, the prediction accuracy of the sending rate of the transmission terminal is improved comparing with that by the operations of the second modified dynamic shaping apparatus which effects sending rate prediction of the transmission terminal based only on ER information.

Accordingly, the third modified dynamic shaping apparatus is advantageous, in addition to the advantages of the second modified dynamic shaping apparatus described above, in that more precise shaping rate control can be achieved comparing with the second modified dynamic shaping apparatus.

A delay of a rate variation where a dynamic shaping apparatus according to the present invention is installed in an ATM network which can provide the ABR service will be described below.

Figure 11:
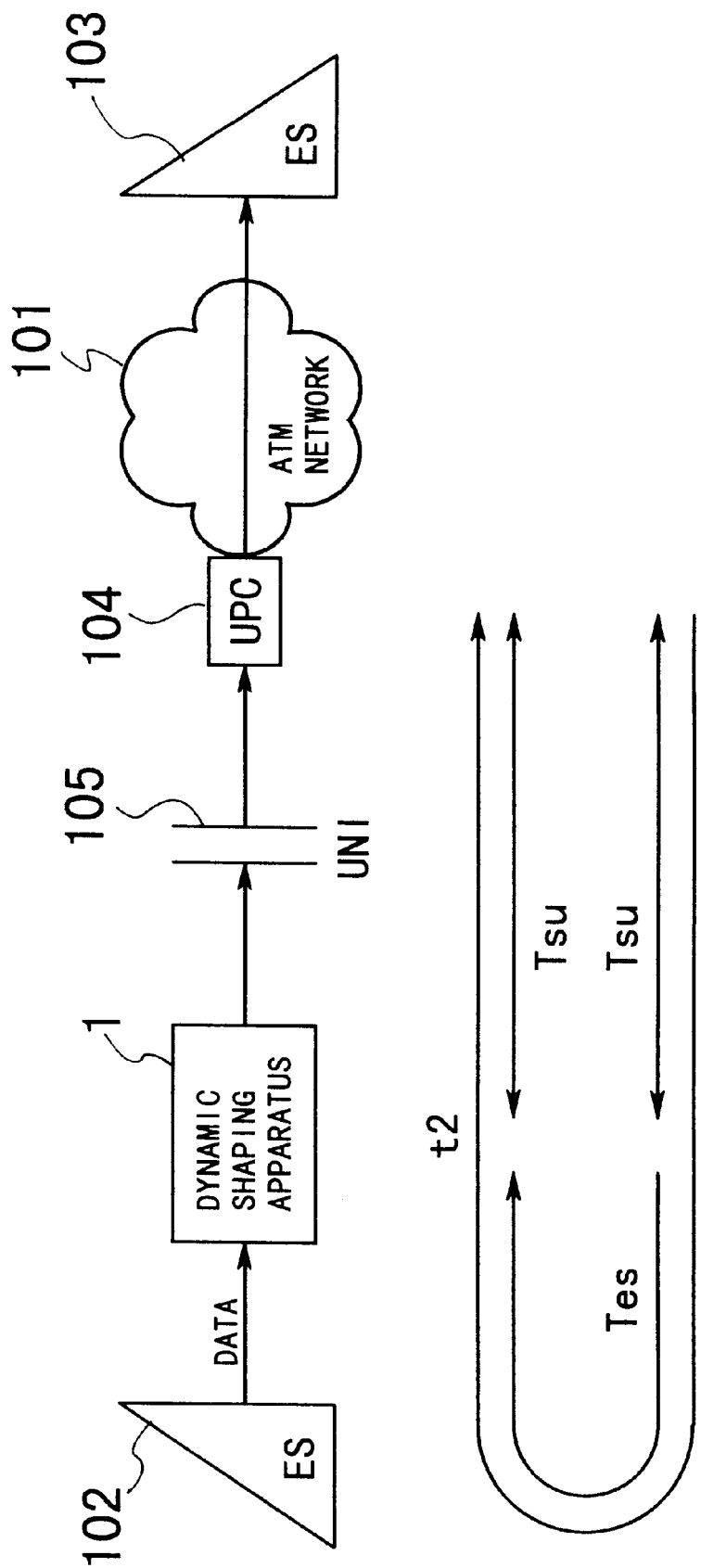
FIG. 11 is a diagrammatic view showing an ATM network which includes a dynamic shaping apparatus according to the present invention and can provide the ABR service.

FIG. 11 illustrates a concept of an ATM network in which a dynamic shaping apparatus according the present invention is installed and which can provide the ABR service.

Referring to FIG. 11, reference character Tes denotes a time required to vary a shaping rate after a rate variation of a transmission terminal 102 is predicted by a dynamic shaping apparatus 1, and Tsu denotes a propagation delay between the dynamic shaping apparatus 1 and a UPC 104. The time t2 required to vary the monitoring rate after a rate variation of the transmission terminal 102 is detected by the UPC 104 is given by t2=Tes+2×Tsu.

Since the dynamic shaping apparatus 1 is installed at a point nearest to the UPC 104 with a UNI 105 interposed therebetween, Tsu is a constant value.

Where the dynamic shaping apparatus 1 is installed in the ATM network which can provide the ABR service and a rate variation is effected by the dynamic shaping apparatus 1, the time t2 required, after the monitoring rate to vary a rate variation is detected by the UPC 104, is the sum of the propagation delay 2×Tsu and an internal processing delay of the dynamic shaping apparatus 1.

Here, since the internal processing delay of the dynamic shaping apparatus 1 is a value which can be set by the dynamic shaping apparatus 1, the time margin until the monitoring rate is varied after a rate variation of the transmission terminal 102 is detected by the UPC 104 can be reduced by setting the sum of 2×Tsu and the internal processing delay of the dynamic shaping apparatus 1 to a value lower than τ2 which is the latest time within a prescribed range after the rate variation of the transmission terminal 102 is detected.

Having now fully described the invention, it will be apparent to one of ordinary skill in the art that many changes and modifications can be made thereto without departing from the spirit and scope of the invention as set forth herein.

What is claimed is:

1. A dynamic traffic shaping apparatus which is installed in an ATM network which provides an available bit rate service wherein band management is effected with a resource management (RM) cell, and sends out an arrival (user) cell arriving from a transmission terminal side to a reception terminal side adjusting an interval of the cell from a preceding arrival cell for each virtual path and each virtual channel, comprising:

a cell buffer for temporarily storing the arrival cell arriving from the transmission terminal side for each virtual path and each virtual channel;

a write control section for storing the arrival cell into said cell buffer in response to a virtual path identifier and a virtual channel identifier of the arrival cell;

a rate information processing section for predicting a sending rate of the transmission terminal in response to rate control information detected from a RM cell directed from the reception terminal side toward the transmission terminal side said rate information processing section receiving virtual path data and virtual channel data from said RM cell and including a rate information management table for storing said sending rate data in association with both the virtual path data and the virtual channel data; and a read control section coupled to said rate information processing section for sending out the cells stored in said cell buffer at a sending time, said read control section including a schedule management queue for storing said sending time in association with the virtual path data and the virtual channel data, said sending time determined from a current time and a cell interval calculated from said sending rate data stored in said rate information management table.

2. The dynamic traffic shaping apparatus as claimed in claim 1, wherein said rate control information processing section predicts a sending rate of the transmission terminal from an explicit rate to the transmission terminal detected from said resource management cell directed from the reception terminal to the transmission terminal, and successively stores the explicit rate in an updating manner for the virtual path and the virtual channel of the arrival cell.

3. The dynamic traffic shaping apparatus as claimed in claim 1, wherein said rate control information processing section predicts said sending rate of the transmission terminal based on any of or any combination of an arrival time, a type and information in a payload of said RM cell directed from the reception terminal to the transmission terminal, and successively stores the sending rate in an updating manner for the virtual path and the virtual channel of the arrival cell.

4. The dynamic traffic shaping apparatus as claimed in claim 1, wherein said rate information processing section successively stores said sending rate of the transmission terminal based on rate control information detected from said RM cell directed from the reception terminal side to the transmission terminal side and an application start time of the sending rate calculated from a delay time set by the network side in an updating manner as sending rate information of the arrival cell for the virtual path and the virtual channel, and said read control section selects sending rate information based on the application start times of sending rate information stored in said rate information processing section corresponding to the virtual path and the virtual channel, reads out the cell stored in said cell buffer at an interval based on the selected sending rate information and sends out the cell to the reception terminal side.

5. The dynamic traffic shaping apparatus as claimed in claim 1, wherein said rate information processing section successively stores said sending rate of the transmission terminal based on rate control information detected from said RM cell directed from the reception terminal side to the transmission terminal side in an updating manner as latest sending rate information of the arrival cell corresponding to the virtual path and the virtual channel, and said read control section reads out the cell stored in said cell buffer at an interval based on the latest sending rate information stored in said rate information processing section corresponding to the virtual path and the virtual channel and sends out the cell to the reception terminal side.

* * * * *